United States Patent [19]
Simoni

[11] Patent Number: 5,136,174
[45] Date of Patent: Aug. 4, 1992

[54] MULTI-PADDLEWHEEL SYSTEM FOR GENERATING ELECTRICITY FROM WATER CANAL

[76] Inventor: Richard P. Simoni, 511 Ave. Del Ora, Redwood City, Calif. 94062

[21] Appl. No.: 615,993

[22] Filed: Nov. 20, 1990

[51] Int. Cl.$^5$ ............................................. F03B 13/12
[52] U.S. Cl. ...................................... 290/54; 74/572; 290/43
[58] Field of Search ................ 290/43, 54, 53; 74/573

[56] References Cited

U.S. PATENT DOCUMENTS

| | | | |
|---|---|---|---|
| 867,192 | 9/1907 | Dawson | 290/43 |
| 3,248,967 | 5/1966 | Lewis | 74/573 |
| 4,270,056 | 5/1981 | Wright | 290/54 |
| 4,301,377 | 11/1981 | Rydz | 290/43 |
| 4,730,154 | 3/1988 | Pinson | 290/54 |

FOREIGN PATENT DOCUMENTS

| | | | |
|---|---|---|---|
| 2420668 | 11/1979 | France | 290/54 |
| 102571 | 6/1982 | Japan | 290/54 |

Primary Examiner—A. D. Pellinen
Assistant Examiner—Robert Loyd Hoover
Attorney, Agent, or Firm—David Pressman

[57] ABSTRACT

A generator for electricity, utilizing one or two groups (29A and 29B) of separately placed water-driven paddlewheels (31) placed side by side in man-made canal. Each group is coupled together by a belt (41A and 41B) embracing a plurality of drive pulleys (43) which deliver power to central assembly pulleys (70A and 70B) on a single shaft (67). The central assembly pulleys each incorporate a centrifugal clutch (75 and 75') which transmits power to flywheel device (71A) which monitors rotational speed, thereby building up angular momemtum. A pulley (72) delivers the power via a belt (90) to a power-take-off pulley (104), then through a centrifugal clutch (92) to a shaft (91) and then to a generator (82).

20 Claims, 5 Drawing Sheets

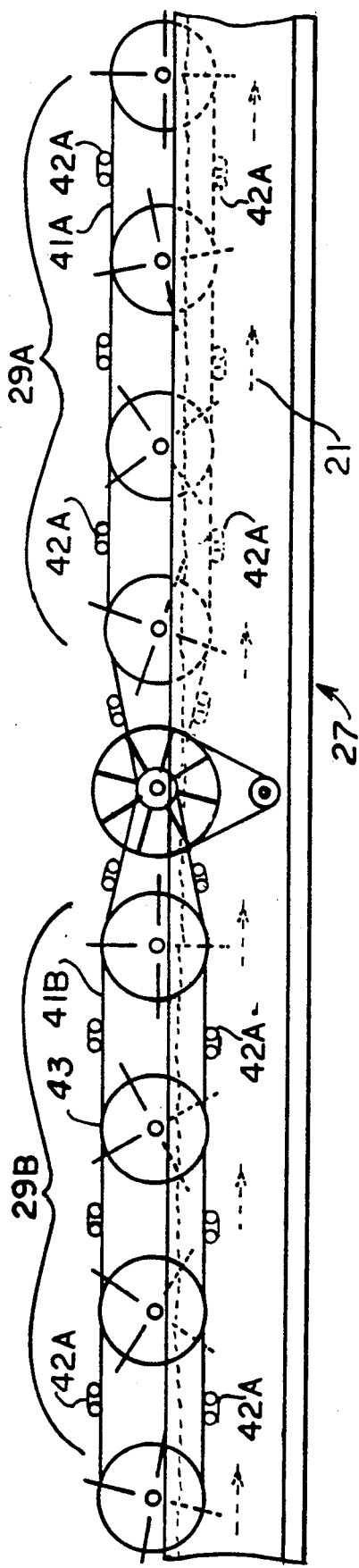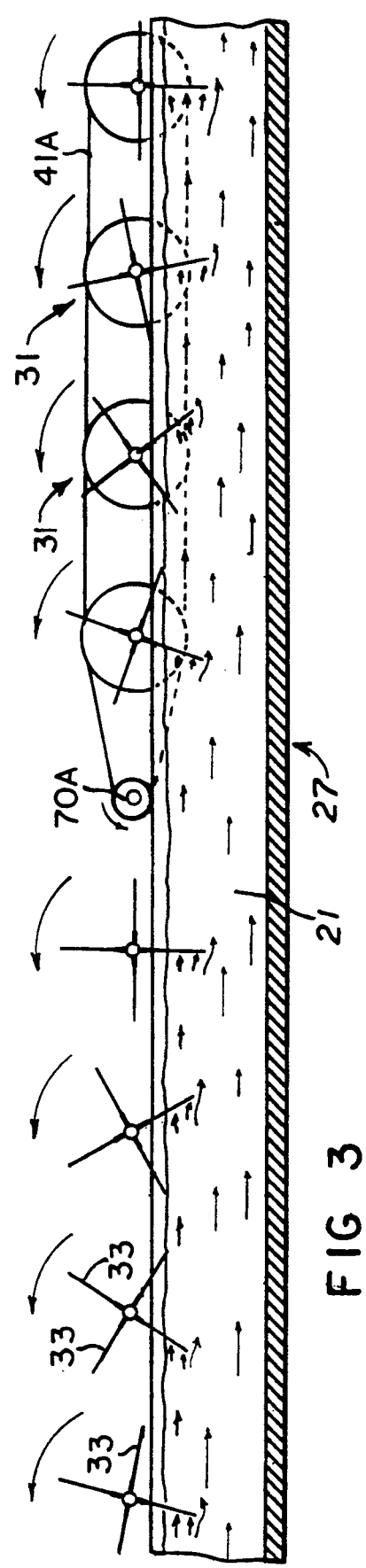
FIG 2
FIG 3

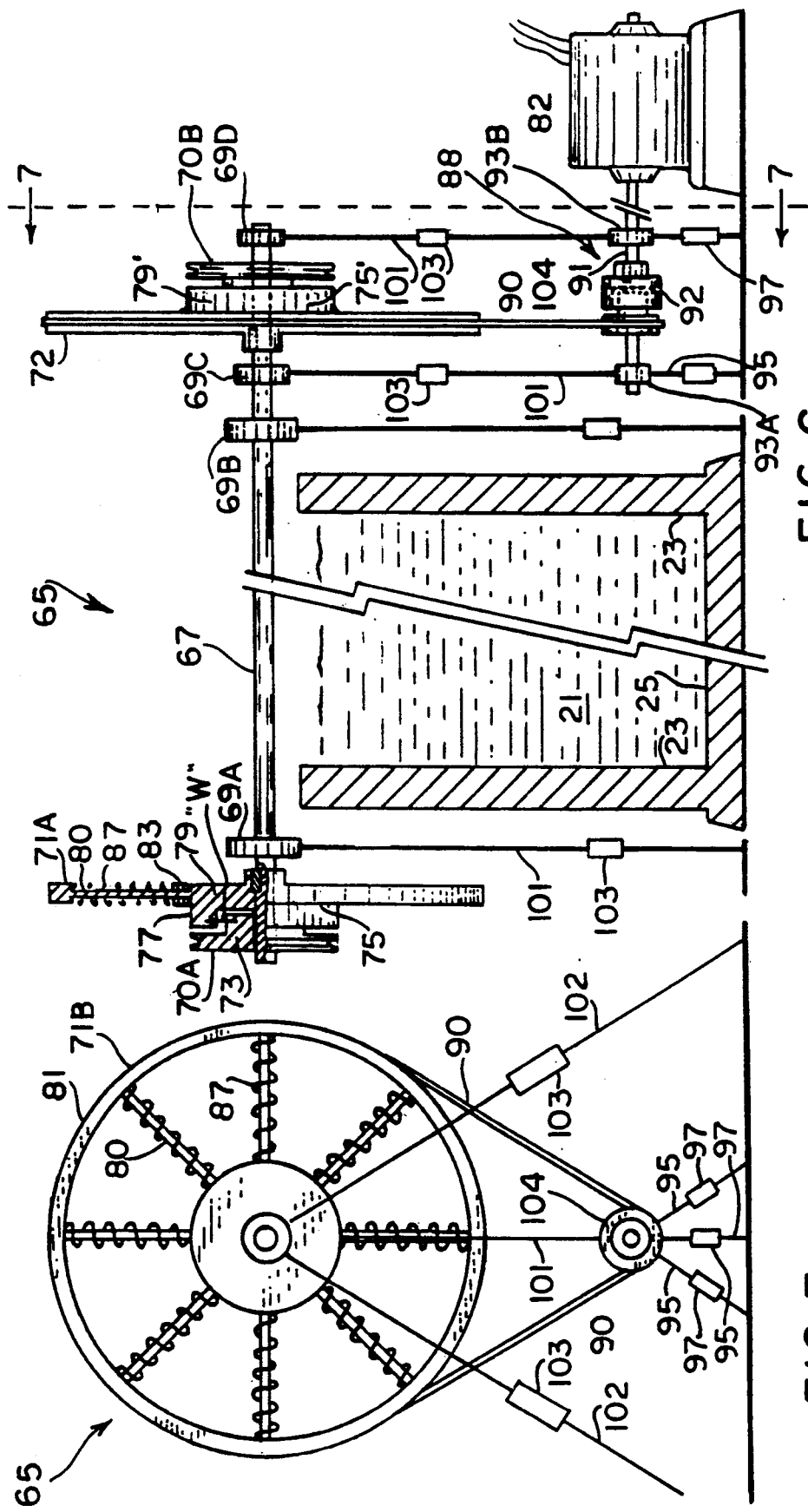

MULTI-PADDLEWHEEL SYSTEM FOR GENERATING ELECTRICITY FROM WATER CANAL

Background

1. Field of Invention

The present invention relates to electrical generators, specially to such a generator which converts the kinetic energy of flowing water to electrical energy.

2. Description of Prior Art

In many countries throughout the world there are hundreds of miles of canals. These are used to transfer water from one place to another, sometimes for agricultural purposes, sometimes from a storage dam at one hydroelectric plant to another storage dam to operate still another hydroelectric plant.

The kinetic energy of the water flowing along these canals, as well as the electric energy which could be generated from the water along its entire length, goes to waste. This waste continues in many countries, even where there is a dire shortage of electricity. In the past, no system has been able to generate electricity from relatively slow-moving water, e.g., 1.25 to 2 meters (4 to 6.5 ft.) per second in existing water canals.

However, some attempts have been made to generate electricity by the use of paddlewheel devices in slow-moving water in creeks and gullies, and also in sea water along beaches from wave action. However these devices have not become popular as a means to generate large quantities of electricity. This is due to the high cost of installing the plants compared to the small amounts of electricity generated, the insecurity of the electrical supply due to the possibility of prolonged droughts, and the possibility of damage to the installations and consequential prolonged disruption due to floods.

Horiuchi, in U.S. Pat. No. 4,872,805, dated Oct. 10, 1989, shows a paddlewheel generator mounted on floats which are to be deployed in rivers and creeks. This device is subject to water damage due to floods and debris carried by such flood waters. It also will be inoperable when insufficient water is available to drive the system. It requires a comparatively large area in which to operate, i.e., it would not be practical to provide additional similiar installations immediately before or after it or in close proximity, or in coordination to it because of the large number of guide ropes, anchor ropes, electrical connections needed to position one in relation with the other. Furthermore, accessability is available only by boat, so that maintenance is not as practicable as it is on land-mounted generating plants. In addition, the cost of a float on which to mount the plant is in itself an additional substantial expense, as are the mooring fixtures, anchors, and cables, and maintenance thereof.

Rydz, in U.S. Pat. No. 4,301,377, dated Dec. 3, 1979, shows waterwheels mounted in tandem and parallel. His system has vanes designed to catch and withstand sea waves which come intermittently and periodically with great intensity and from various directions. They are not designed to cope with a consistent flow of water at low speeds. Since it requires a large mooring pivot and an extensive supporting structure, this system is typical of most large-scale arrangements: a clever idea, but lacking in practical utility.

Toke, in U.S. Pat. No. 2,813,401, dated Apr. 15, 1982, shows a flywheel device for storing and later dispersing electrical energy. The problem with this system is that it does not supply a constant flow of electricity.

Lenoir, in U.S. Pat. No. 4,818,888, dated Apr. 4, 1989 shows a method of harnessing small quantities of flowing water, such as found in creeks and brooks. The problem with this device is that it uses but one waterwheel to drive but one electric generator which is mounted on an adjacent platform, thereby being unable to supply a large quantity of power. Also the water has to be deep enough to submerge the entire waterwheel since it rotates horizontally with hinged blades attached to vertical rods.

OBJECTS AND ADVANTAGES

Accordingly, several objects and advantages of my invention are to provide a device which can obtain large quantities of electricity from comparatively slow moving water in human-made canals, to provide a system using paddlewheels in these canals to generate electricity, to provide a generating plant which is comparatively inexpensive to build and install, and to provide a generating plant which is easy to access and maintain and to keep performance records of. Other objects are to provide such a system which can be positioned along a canal so that the same water is used multiple times.

Further objects and advantages are to make use of the source of power available from flowing water in canals which has heretofore gone untapped, and to provide a system in which numerous like systems can be placed along a single channel or canal without interference, so that the same water can be used multiple times. Still further objects and advantages will become apparent from a consideration of the ensuing description and accompanying drawings.

BRIEF DESCRIPTION OF DRAWINGS

FIG. 2 is a side view of the system shown in FIG. 1.

FIG. 3 is a sectional view of the system taken along the line of 3—3 in FIG. 1.

FIG. 6 is a part sectional, part front view of the center drive assembly and a final power-take-off (PTO) drive and generator used in the system.

FIG. 7 is an end view of the center drive assembly taken along the line 7—7 of FIG. 6.

REFERENCE NUMERALS

21—water
23—sides of canal
25—bottom of canal
27—canal
29A and 29B—paddle wheel combinations
31—paddle wheel
33—vanes
35—transverse shaft
37—bearings
39—supports
41A and 41B—V-belts 42A and 42B—belt adjusters
43—pulleys
45—elongated space
47—top edge
49—lip
50—tapered space
51—bleed holes
52—rollers
52'—guide
53—bow-spring
53'—compression spring
54—nut
54'—frame
55—union
56—screw
57—hydraulic height adjusters
59—diagonal structure
61—diagonal adjuster
65—central assembly
67—shaft
69A-69D—bearings
70A and 70B—pulleys
71A—flywheel
72—pulley
73—inner member
75 and 75'—centrifugal clutch
77—outer member
79—boss
79'—boss of pulley
80—spokes
81—rim
82—generator
83—weights
87—springs
88—power-take-off unit (P.T.O.)
90—belt
91—power-take-off shaft
92—centrifugal clutch
93A and 93B—bearings
95—support structure
97—hydraulic adjuster
101—vertical structure
102—diagonal structure
103—hydraulic adjuster
104—pulley

DETAILED DESCRIPTION OF THE PREFERRED EMBODIMENT—FIGS. 1-3

The present invention is a complete apparatus for harnessing the kinetic energy of the water current in a typical canal, e.g., a man-made concrete base with sides which is used to transfer large quantities of water for irrigation, or to another suitable storage site where it can be used again for hydroelectric generation.

Figure 1:
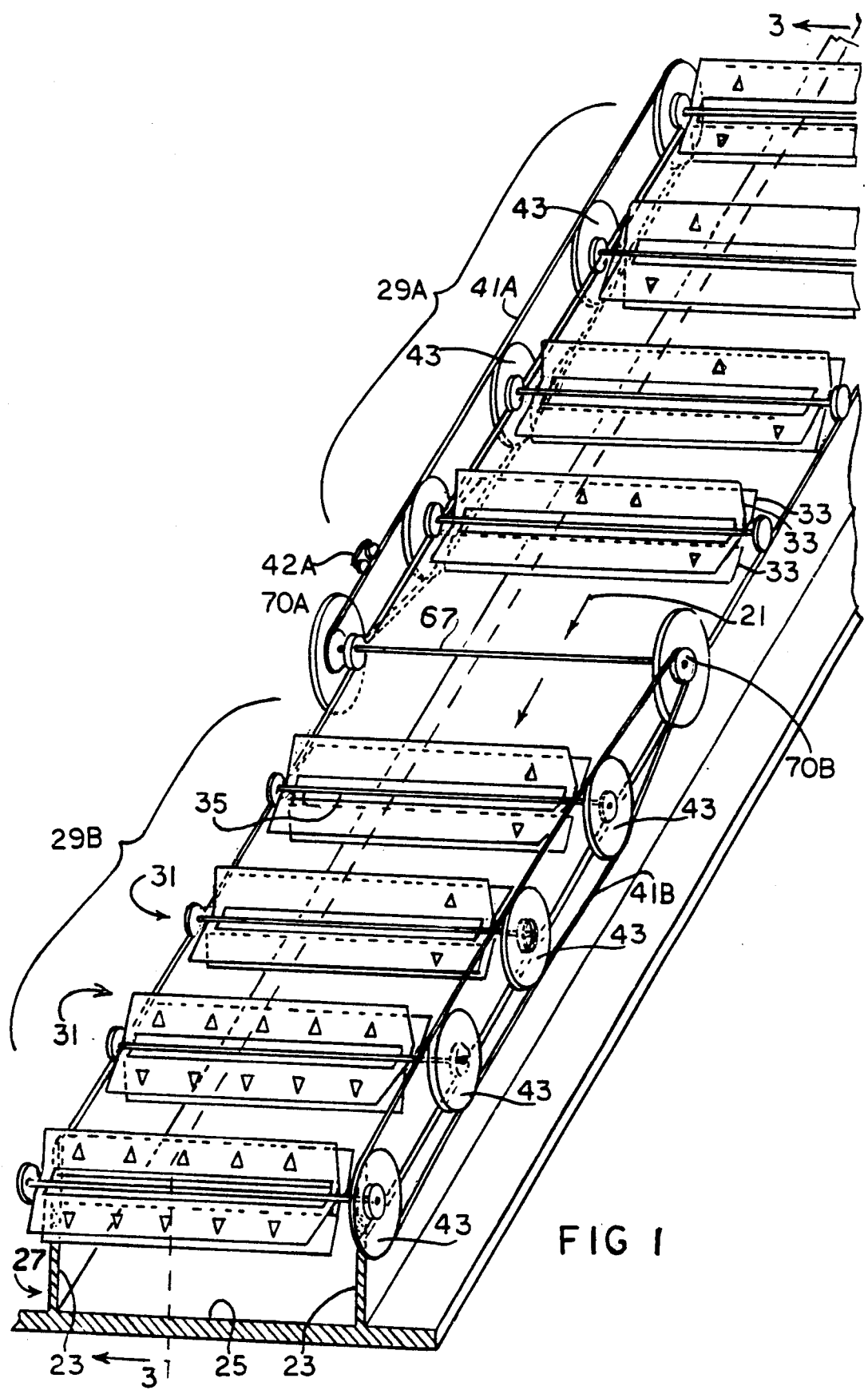
FIG. 1 is a perspective view of a generating system of the present invention.

A perspective view of a tandem arrangement of a paddle wheel generating system mounted on a typical canal 27 is shown in FIGS. 1-3. Water 21 flows within canal 27 and is confined by the canal's sides 23 and bottom 25. A typical canal is 5 to 6 meters (17 to 20') wide, and 2.5 to 3.5 meters (7 to 10') deep, and 40K (25 miles) long. Water 21 is about 2.5 to 3.5 meters (7' to 10') deep and flows at a speed of 2.75 to 3.25 meters (9' to 11') per second. Mounted generally above canal 27 are two sets of multi-paddlewheel combinations 29A and 29B. Each combination comprises a plurality of paddlewheels 31 which each have a plurality of vanes 33 mounted radially on a transverse axle or shaft 35. Each vane is about 4.5 to 5.5 meters (15' to 17') wide by 1 to 1.25 meters (3' to 4') deep and all other parts are sized to scale in these figures.

Figure 4:
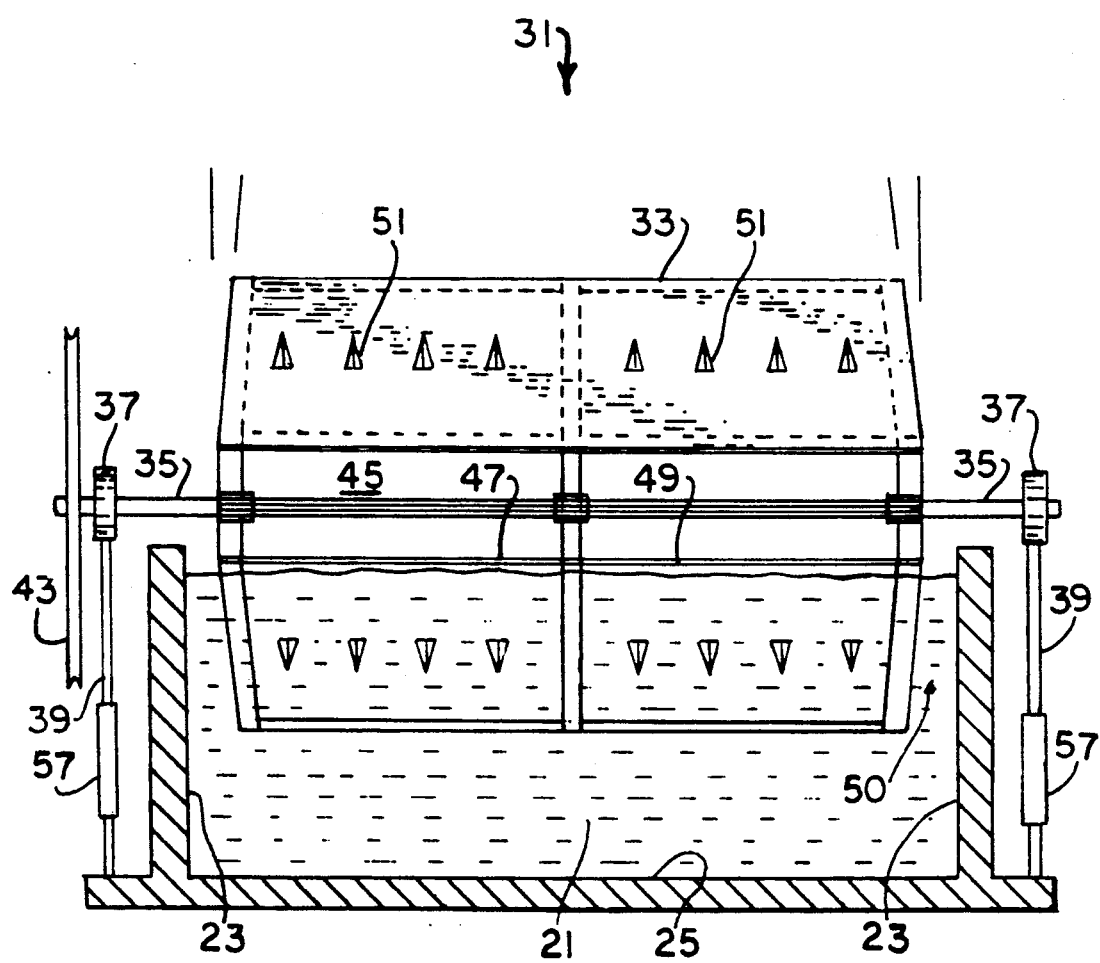
FIG. 4 is a sectional view of a canal and a front view of a paddle wheel of the generating system within the canal.

Transverse shaft 35 (FIG. 4) is mounted in bearings 37. Bearings 37 are supported on individual support frames 39. Each shaft 35 has a drive pulley or sheave 43 attached and adjusted such that it lines up and cooperates with three other such drive pulleys on other shafts 35 within its set of four drive shafts and pulleys 29A and 29B as shown in FIGS. 1-3.

A first V-belt 41A embraces a group 29A of four drive pulleys 43 and extends to a central shaft and pulley assembly 70A (FIGS. 1-3). The operating tension of belt 41A is maintained by numerous belt adjusters 42A (FIG. 2) positioned between each two pulleys 43. Each tensioner 42A (FIG. 5) comprises two rollers 52 mounted on a belt guides 52' which in turn is attached to a bow spring 53. Pressure of rollers 52 against belt 41A is maintained by compression springs 53 and 55' which can be adjusted by nut 54 bearing against frame 54'. Frame 54' is supported by vertical members 101 and 39, and can be also be adjusted up or down by moving unions 55 and then locking them in position by set screws 56.

Another V belt 41B embraces a combination 29B of four drive pulleys 43 and extends to central shaft and pulley assembly 70B (FIG. 1). The operating tension of belt 41B is maintained by belt adjusters 42A positioned between each adjacent pair of pulleys 43. (FIG. 2). As described above, each tensioner comprises two rollers. Each roller has a flange on either side of the V-belt and is mounted centrally between both pulleys such that both rollers touch and apply pressure onto the V belt's back.

Pulleys 70A and 70B are freely mounted on the opposite ends of central assembly shaft 67 (FIG. 1). Pulley 70A is indirectly connected by a centrifugal clutch 75 (FIG. 6) to boss 79 of flywheel 71A. Boss 75 is keyed to central shaft 67.

Pulley 70B on the opposite end of shaft 67 is indirectly connected by centrifugal clutch 75' to boss 79' of pulley 72. Boss 79' is also keyed to shaft 67. Thus power is transmitted from both paddlewheel combinations 29A and 29B to common shaft 67 through centrifugal clutches. By the above arrangement it is possible to isolate the driving power of combination 29A, but still allow power from combination 29B to continue normal operation. It is also possible to isolate drive power from combination 29B, and still allow combination 29A to continue normal operation.

A further advantage with the above arrangement is that it is possible to install a central drive assembly with only one source of power, i.e., a combination of paddlewheels such as 29A or 29B, without having to make any changes to the construction of the central assembly, also the drive can be to either side.

PADDLEWHEEL CONSTRUCTION—FIG. 4

Each paddlewheel 31 (FIG. 4) in both groups 29A and 29B comprises a shaft 35 which extends across the full width of canal 27 and outside the vertical planes of canal sides 23. Evenly spaced around each shaft 35 are vanes 33 which are attached by a frame 39 to shaft 35. These vanes dip sequentially into the flowing water during rotation of paddlewheels 31, best seen in FIGS. 3 and 4. An elongated space 45 (FIG. 4) is provided between inner edge 47 of vane 33 and shaft 35. This space provides a passageway through which water can escape and not build-up excessively against shaft 35, in the event of an unexpected rise in the canal's water level.

Figure 5:
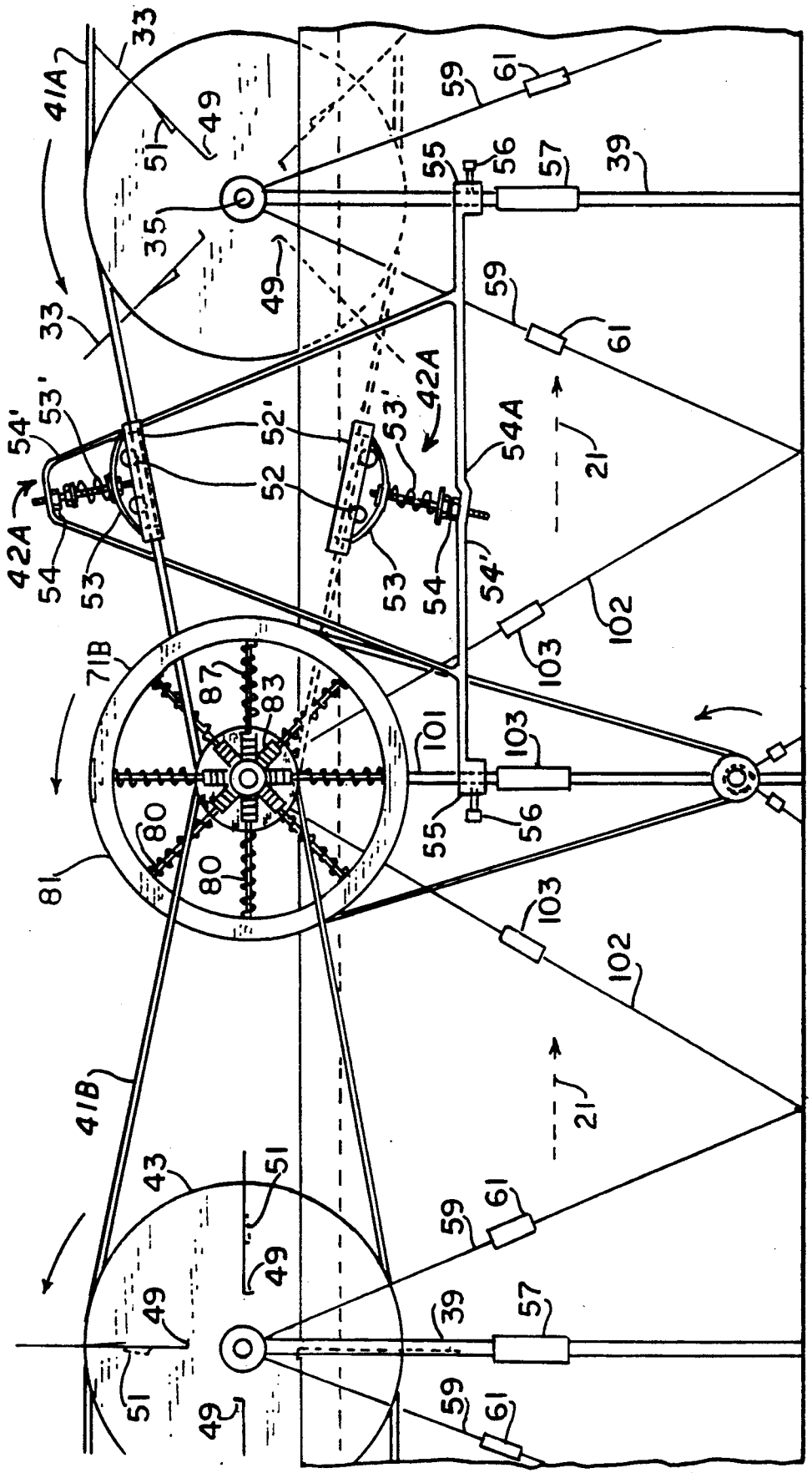
FIG. 5 is a side view of a center drive assembly, adjacent paddle wheel drives, a supporting structure, and an anchor tie-down system used in the generating system.

Inner edge 47 has a lip 49 (best seen in FIG. 5) which is bent in the direction of the oncoming water, as shown by arrows 21 (FIGS. 2 and 5). This lip increases the efficiency of the vane by containing the flow of water against the vane while the water level is within its desired height.

A tapered space 50 (FIG. 4) is also provided at each end of each vane 33 to allow some water to bypass the vane and eliminate any chance of friction between end of vane 33 and wall 23.

In addition each vane 33 has a plurality of suction relief air bleed holes 51 whose purpose is to diminish the tendency of a partial vacuum forming under the vanes as they ascend from under the water to the air as the waterwheel turns. Any partial vacuum which may form between the vanes and water, no matter how small, will tend to retard the free rotation of the paddlewheels. Air bleed holes 51 are pressed-out holes evenly spaced centrally across each vane 33 towards the side opposite to the oncoming water.

Two support bearings 37 (FIG. 4) are positioned on shaft 35 above and outside the vertical planes of canal wall 23. These bearings are supported by vertical structures 39. Each structure incorporates a hydraulic height adjuster 57. In addition, bearings 37 can be moved fore and aft by diagonal structures 59 (FIG. 5). Each structure also incorporates hydraulic adjusters 61 (FIG. 5). While lowering and positioning each paddlewheel assembly into a canal, adjusters 57 on vertical supports 39 and adjusters 61 on diagonal supports are used to control, position, and adjust each assembly into the exact position and depth. Once all the paddlewheels are properly positioned relative to each other, and placed at the desired depth in the flowing water, these adjusters will have little further use except to maintain these positions.

A pulley 43 is attached to one end of shaft 35 on each paddlewheel assembly.

Hydraulic adjustments are provided on all paddlewheels in each combination. I.e., each paddlewheel assembly is separate from its adjacent paddlewheel assembly, or assemblies, and can be adjusted forward, backward, downward, and upward, individually of any other assembly.

CENTRAL ASSEMBLY—FIGS. 6 AND 7

Central assembly 65 (FIGS. 6 and 7) comprises a shaft 67 mounted on bearings 69A to 69D. Shaft 67 is fitted with two pulleys 70A and 70B, a flywheel, and a large diameter pulley 72. This flywheel is known as an "angular momentum storage and rotational compensating flywheel" and will be described below.

Pulley 70A is free-floating on shaft 67 and is connected directly to inner member 73 of centrifugal clutch 75. Inner member is fitted with weighted clutch pads (shown by arrow "W") which are thrown outward under centrifugal force when subjected to rotation so as to engage outer member 77, which is part of flywheel 71A.

Flywheel 71A comprises a boss 79, eight evenly-spaced spokes 80, and an outer rim 81. Spokes 80 are axially consistent in diameter and are embraced by a plurality of free-sliding weights 83 (FIG. 5). Weights 83 are held in contact with boss 79 by compression springs 87 when the flywheel is at rest.

Pulley 72 is on the opposite end of assembly shaft 67. It receives the power from paddlewheel combination 29B via V-belt 41B which drives assembly pulley 70B (FIG. 6). The drive to pulley 72 from pulley 70B is virtually the same as described in the previous paragraph for pulley 70A to flywheel 71A.

Bearings 69A to 69D are supported by vertical and diagonal structures 101 and each incorporates a hydraulic adjuster 103.

Pulley 72 drives a power-take-off (P.T.O.) 88 via a V-belt 90. P.T.O. 88 also incorporates a centrifugal clutch 92, which performs in the same manner as those on shaft 67. P.T.O. shaft 91 is mounted on bearings 93A and 93B, which are supported by vertical and diagonal support structure 95 incorporating hydraulic adjusters 97.

Shaft 91 is connected directly to a generator 82, but it can be connected indirectly via a pulley and belt arrangement, set of gears, an inner and outer cable, sprocket and chain drive, or a variable V-belt drive which could be used to adjust generator speed.

CENTRAL ASSEMBLY COMPENSATING DEVICE—FIG. 5

When the paddlewheel's drive to pulley 70A rotates sufficiently fast, e.g., 160 to 180 r.p.m., centrifugal clutch 75 will engage to drive flywheel 71A. When flywheel 71A rotates fast enough, weights 83 will be thrown outward by centrifugal force and will compress springs 87, thereby building angular momentum. A diminution in the speed of water flow, or depth of water flow, will slow the rotational speed of the paddlewheels, whereby they will put out less power. The result will be less outward (centrifugal) force on weights 83, a reduced angular momentum, and therefore a slower generator speed.

CENTER DRIVE ASSEMBLY AND POWER-TAKE-OFF ADJUSTMENTS—FIG. 6

There are four bearings 69A-69D on shaft 67. Each bearing has its own support structure 101. Also each support structure has a hydraulic adjuster 103. In addition, P.T.O. 88 also has two hydraulic adjusters 97.

P.T.O. 88 is driven by a belt 90 from pulley 72. When sufficient rotational speed is developed in pulley 104, centrifugal force transfers the rotation to P.T.O. shaft 91, and then by direct or indirect drive to generator 82.

OPERATION

Each paddlewheel produces enough power to drive a small generator. However, it is more economical to drive one large generator than numerous small ones.

Water 21 (FIG. 1) drives vanes 33 which cause shaft 35 to rotate. The position of each paddlewheel is individually adjusted in canal 27 by the use of hydraulic adjusters 61 and 57 during imersion, and then maintained in that position during operation. If there is a prolonged increase in the water level in the canal, all the paddles can be adjusted to a higher level by the use of the hydraulic adjusters, and lowered again when the high-level water subsides.

As stated, several paddlewheels are connected in a set by pulleys 43 and V belts 41A and 41B, so that all paddlewheels and their pulleys drive pulleys 70A and 70B, respectively. By having several paddlewheels interconnected by a common V-belt to a central drive assembly, the powers of all paddlewheels are combined and directed to one large generator.

The typical rotational speed of the paddlewheels is about 33 rpm. This is geared up by pulleys 43 and V belts 41A and 41B (FIG. 5) to drive generator shaft 91 (FIG. 6) at a speed of about 1750 rpm. Each set of paddlewheels will have an output power of about 33 KW.

In the "Central Assembly" part, supra, I have described the mechanics to receive driven power from two directions, i.e., from upstream and/or downstream. The present assembly facilitates the application of a second arrangement of paddlewheels situated on the downstream side. If the same number of paddlewheels are incorporated in the downstream side as the upstream side and the power from both is applied to the same central assembly, twice the power can now be obtained so as to drive a very large generator.

SUMMARY, RAMIFICATIONS, AND SCOPE

Thus it will be seen that I have provided a paddlewheel electric generating system which can make effective use of slow-moving waters in canals. Heretofore this source of power has remained untapped. This system makes it possible to use the same water multiple times. Also each system can be a replica of the preceeding plant. Furthermore since each system is alike, tooling is simplified and automation can be employed in production, thereby keeping costs down. Also it permits the use of automation in production, thereby keeping costs down.

The fact that all paddlewheel assemblies are virtually identical and alike in weight also provides simplicity and ease of duplication of installation set up, adjustment, maintenance, and recording performance statistics.

While the above description contains many specificities, the reader should not construe these as limitations on the scope of the invention, but merely as exemplifications of preferred embodiments thereof. Those skilled in the art will envision that many other variations are within its scope. For example, skilled artisans will readily be able to change the dimensions and shapes and numbers of the various embodiments, such as by making the paddles of different shapes or numbers or of different materials. Also the number of paddlewheels can be increased, or reduced, or the drive medium can be changed from V-belt to chain, or toothed belt, or even a rope drive. Also the number of flywheel spokes can be increased or decreased, or fitted with heavier or lighter weights and/or stronger or weaker compression springs. Also the number of rollers in each belt tensioner can be increased or decreased.

Accordingly, the reader is requested to determine the scope of the invention by the appended claims and their legal equivalents, and not by the examples which have been given.

I claim:

1. A system for converting the kinetic power of a flowing fluid to rotational power, comprising:
   a rotatable power wheel having an axle and a plurality of vanes extending radially from said axle so that a flow of fluid in a direction perpendicular to said axle impinges upon said vanes,
   coupling means for coupling rotational power from said rotatable power wheel to a load, said coupling means comprising a flywheel which is rotatably mounted and which has a center of rotation,
   a plurality of weights mounted in inward positions on said flywheel relatively close to said center of rotation of said flywheel
   guide means for allowing said plurality of weights to move by centrifugal force to respective outward positions relatively far from said center of rotation of said flywheel in response to rotation of said flywheel so that said flywheel will build angular momentum, and
   return means for returning said weights from said outward positions to said inward positions in response to a diminution of speed of said flywheel.

2. The system of claim 1 wherein said guide means comprises a plurality of radial spokes on said flywheel.

3. The system of claim 1 wherein said return means comprises a respective plurality of springs.

4. The system of claim 1 wherein each of said vanes has a plurality of suction-relief, air-bleed holes therein.

5. The system of claim 1 wherein each of said vanes has, on a radially-inward edge thereof, a lip which projects in a direction generally normal to said vane for containing water against said vane for increasing the efficiency of said vane.

6. The system of claim 1 wherein each of said vanes has a plurality of suction relief, air-bleed holes therein and wherein each of said vanes has, on a radially-inward edge thereof, a lip which projects in a direction generally normal to said vane for containing water against said vane for increasing the efficiency of said vane.

7. The system of claim 1 wherein said guide means comprises a plurality of radial spokes on said flywheel and wherein said return means comprises a respective plurality of springs mounted on said respective spokes.

8. The system of claim 1 wherein said coupling means also comprises a centrifugal clutch which is arranged to rotate said flywheel in response to rotation of said rotatable power wheel when the speed of rotation of said rotatable power wheel reaches a predetermined value.

9. The system of claim 8 wherein said guide means comprises a plurality of radial spokes on said flywheel and wherein said return means comprises a respective plurality of springs mounted on said respective spokes.

10. The system of claim 1, further including an electrical generator, said coupling means being arranged to drive said generator from said wheels.

11. The system of claim 1 wherein said means for coupling rotational power from said wheels to a load includes means for multiplying the rotational speed of said wheels.

12. A system for converting kinetic power of a flowing fluid to rotational power, comprising:
    a plurality of rotatable power wheels, each of said wheels having an axle and a plurality of vanes radially extending out from said axle so that a flow of fluid in a direction perpendicular to said axle impinges upon said vanes,
    means interconnecting said power wheels so that they are all constrained to rotate at the same speed,
    a flywheel connected to said wheels such that said flywheel is driven by said wheels,
    means for coupling rotational power from said flywheel to a load
    a plurality of weights mounted in inward positions on said flywheel relatively close to said center of rotation of said flywheel
    guide means for allowing said plurality of weights to move by centrifugal force to respective outward positions relatively far from said center of rotation of said flywheel in response to rotation of said flywheel so that said flywheel will build angular momentum, and return means for returning said weights from said outward positions to said inward positions in response to a diminution of speed of said flywheel.

13. The system of claim 12 wherein said means interconnecting comprises a plurality of pulleys mounted on said respective wheels, and a belt wrapped around said pulleys.

14. The system of claim 12 wherein each of said vanes is a flat, rectangular member.

15. The system of claim 12 wherein each of said vanes has a plurality of suction-relief, air-bleed holes therein.

16. The system of claim 12 wherein each of said vanes has, on a radially-inward edge thereof, a lip which projects in a direction generally normal to said vane for containing water against said vane for increasing the efficiency of said vane.

17. The system of claim 32 wherein each of said vanes has a plurality of suction-relief, air-bleed holes therein and wherein each of said vanes has, on a radially-inward edge thereof, a lip which projects in a direction generally normal to said vane for containing water against said vane for increasing the efficiency of said vane.

18. The system of claim 12 wherein said means for coupling comprises means for multiplying the rotational speed of said wheels and an electrical generator connected to receive power from said wheels at a multiplied rotational speed.

19. The system of claim 12, further including mounting means for mounting said plurality of rotatable power wheels in a canal containing a flowing liquid so that said flowing liquid impinges upon said vanes and rotates said wheels, said mounting means being arranged to mount said wheels so that the axles of said wheels are positioned above the surface of said flowing liquid, said mounting means containing vertical adjusting means for adjusting the height of said plurality of rotatable power wheels so that said axles can be kept at the same height above the surface of said flowing liquid even if the level of said flowing liquid changes.

20. The system of claim of claim 12 wherein said means for coupling also comprises a centrifugal clutch which is arranged to rotate said flywheel in response to rotation of said rotatable power wheels when the speed of rotation of said rotatable power wheels reaches a predetermined value.

* * * * *